United States Patent [19]

Ide et al.

[11] Patent Number: 5,513,165
[45] Date of Patent: Apr. 30, 1996

[54] METHOD FOR CONTROLLING THE FARM OF A MAGNETIC DOMAIN OF A MAGNETO-OPTICAL DISK USING PRE-WRITE TESTING

[75] Inventors: Hiroshi Ide, Kodaira; Fumiyoshi Kirino, Tokyo; Tsuyashi Toda, Kodaira; Takeshi Maeda; Hiroyuki Tsuchinaga, both of Kokubunji; Fumio Kugiya, Hachioji; Kazuo Shigematsu, Saitama; Seiichi Mita, Kanagawa; Atsushi Saito, Ichikawa; Toshimitsu Kaku, Sagamihara, all of Japan

[73] Assignee: Hitachi, Ltd., Tokyo, Japan

[21] Appl. No.: 149,931

[22] Filed: Nov. 10, 1993

Related U.S. Application Data

[63] Continuation-in-part of Ser. No. 87,777, Jul. 9, 1993, which is a continuation-in-part of Ser. No. 720,706, Jun. 25, 1991.

[30] Foreign Application Priority Data

| Jun. 29, 1990 | [JP] | Japan | 2-170052 |
| Nov. 11, 1991 | [JP] | Japan | 3-294145 |
| Feb. 13, 1992 | [JP] | Japan | 4-026508 |
| Feb. 13, 1992 | [JP] | Japan | 4-026509 |
| Feb. 13, 1992 | [JP] | Japan | 4-026511 |
| Apr. 21, 1992 | [JP] | Japan | 4-100897 |
| Nov. 12, 1992 | [JP] | Japan | 4-302174 |
| Dec. 28, 1992 | [JP] | Japan | 4-347689 |
| Jan. 11, 1993 | [JP] | Japan | 5-002343 |

[51] Int. Cl.$^6$ .................. G11B 7/00; G11B 7/12
[52] U.S. Cl. .................. 369/116; 369/13
[58] Field of Search .................. 369/13, 54, 58, 369/59, 116, 124, 100, 110; 341/58, 68, 52

[56] References Cited

U.S. PATENT DOCUMENTS

| 5,038,338 | 8/1991 | Terao et al. | 369/116 |
| 5,185,733 | 2/1993 | Finkelstein et al. | 369/54 |
| 5,268,893 | 12/1993 | Call et al. | 369/116 |
| 5,327,124 | 7/1994 | Funamoto | 341/58 |
| 5,345,434 | 9/1994 | Ide et al. | 369/124 |
| 5,381,396 | 1/1995 | Tanaka et al. | 369/116 |
| 5,418,770 | 5/1995 | Ide et al. | 369/116 |

FOREIGN PATENT DOCUMENTS

| 3-22223 | 1/1991 | Japan . |
| 4-265522 | 9/1992 | Japan . |
| 6208740 | 7/1994 | Japan . |

Primary Examiner—Georgia Y. Epps
Assistant Examiner—Kim-Kwok Chu
Attorney, Agent, or Firm—Antonelli, Terry, Stout & Kraus

[57] ABSTRACT

An optical recording control method determines an optimum recording laser power by effecting a test recording before information to be recorded is recorded on a disk. The recording laser power is formed of a plurality of powers. A relationship among the plurality of laser powers is regulated by power level ratios between respective powers, whereby a power used when a laser light is radiated on the disk can be controlled to be constant independent of an ambient temperature and a structure of a disk. Therefore, accurate recording marks can be formed on the disk.

23 Claims, 10 Drawing Sheets

F I G. 1
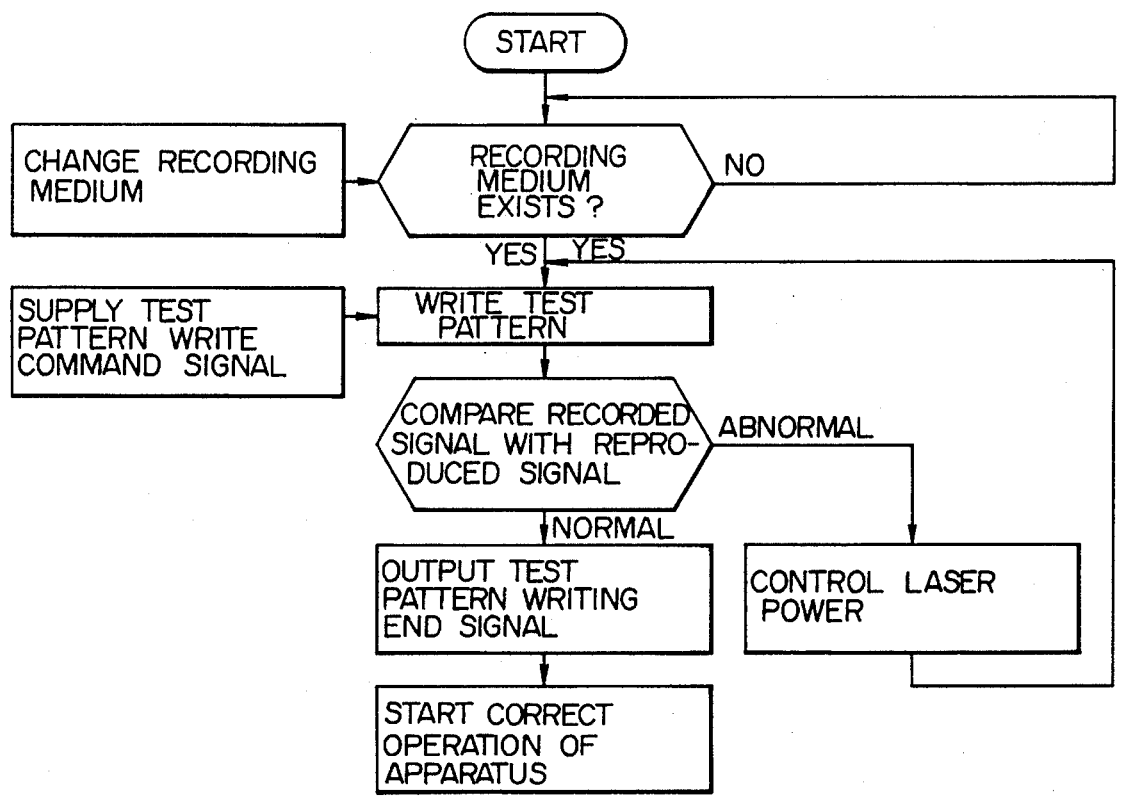
F I G. 2
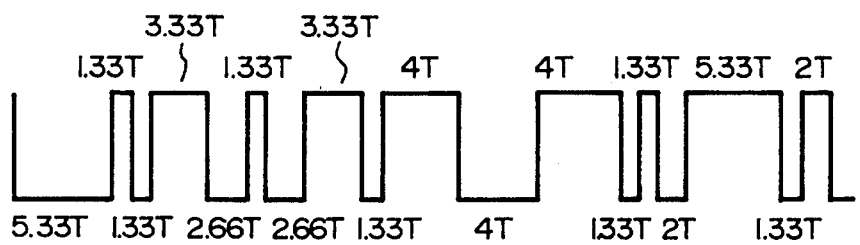

Tw INDICATES 40ns IN INNERMOST PERIPHERY AT 3000 r.p.m.

PULSE STRUCTURE (2Tw)

REFERENCE EDGE : UU → Eu  DD → Ed
REMARKABLE EDGE : E1, E2
(Tw IS 40ns IN INNERMOST PERIPHERY
(5.25" r = 30mm))

PULSE STRUCTURE (IN THE CASE OF 3TW)

PULSE STRUCTURE (IN THE CASE OF 3TW)

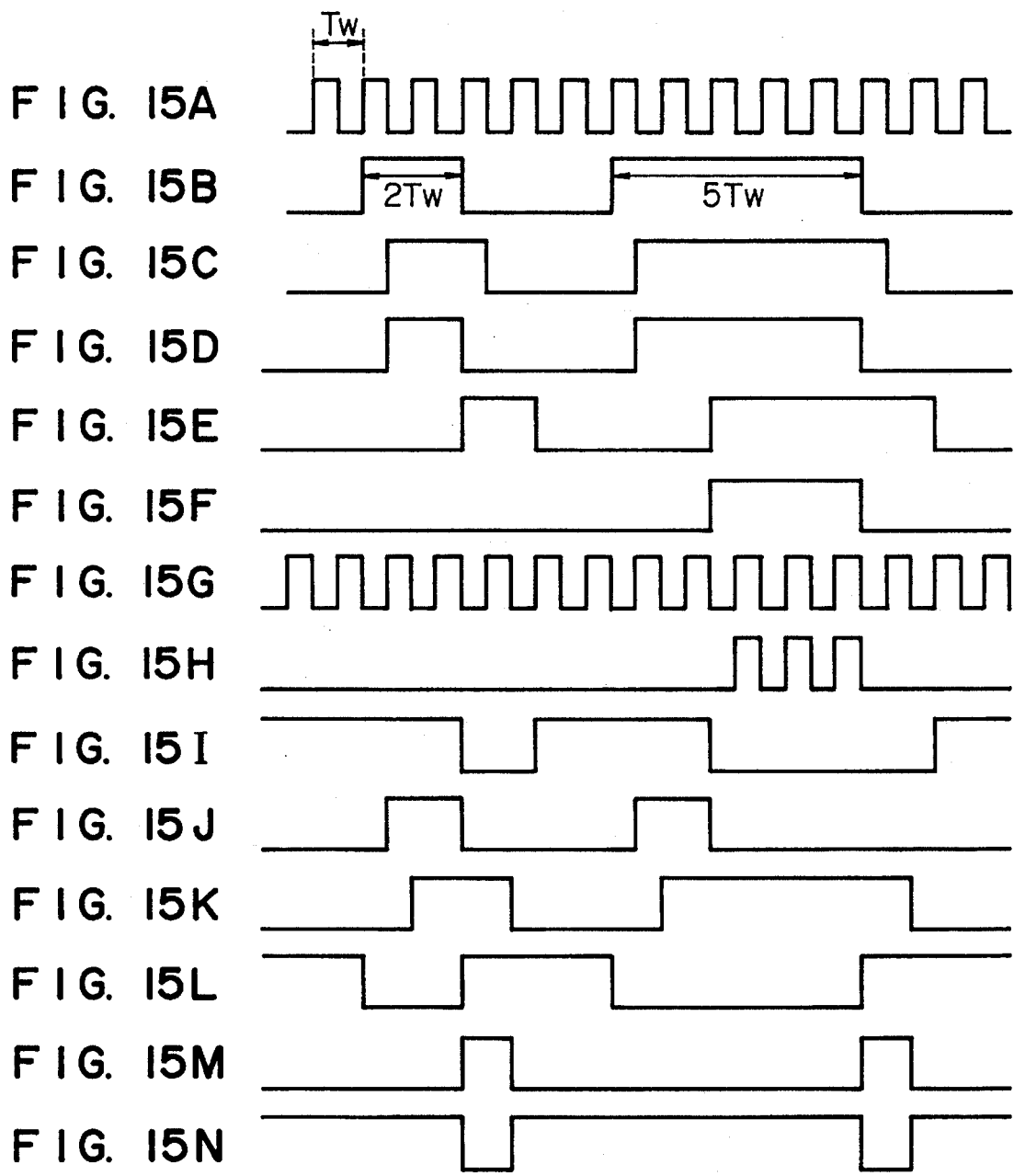

METHOD FOR CONTROLLING THE FARM OF A MAGNETIC DOMAIN OF A MAGNETO-OPTICAL DISK USING PRE-WRITE TESTING

CROSS-REFERENCE TO RELATED APPLICATION

The present application is a Continuation-In-Part of U.S. patent application Ser. No. 08/087,777 filed on Jul. 9, 1993 corresponding to International Application No. PCT/JP92/01460 filed on Nov. 10, 1992 in the Japanese language, which is a Continuation-In-Part of U.S. patent application Ser. No. 07/720706 filed on Jun. 25, 1991. The disclosure of these applications is incorporated herein by reference.

BACKGROUND OF THE INVENTION

The present invention relates to a recording method of a magneto-optical recording for use in high density recording in a magneto-optical recording in which information can be recorded, reproduced or erased by a laser light and an externally applied magnetic field. In addition, the present invention relates to a recording method for use in establishing a compatibility between media.

Heretofore, three kinds of disks, i.e., a read only optical disk, a write once optical disk and an erasable optical disk have been commercially available on the market as the optical recording disk. Particularly, a magneto-optical recording disk is widely used as an erasable memory, a document file or an image file.

Recently, many research institutes had advanced research and development of the disks in order to improve disk performance. One of the improvements of disk performance is to improve a recording density. A recording system that can improve a recording density employs a mark length recording format, a zone CAV (constant angular velocity) format or the like, Further, other researches that are independent of the recording system are advanced in order to improve a recording density by reducing a track pitch and a bit pitch and by using a laser light source of a short wavelength, etc.

A recording capacity of a current 5.25-inch single-sided disk is 320 MB. The research and development are now advanced in order to achieve a recording density of at least three times the above-mentioned recording capacity as a target recording capacity.

The magneto-optical recording is fundamentally a thermo-magnetic recording so that, in order to increase a recording density, the recording must be effected while a micro-recording magnetic domain is stable and without an interference between recording magnetic domains. Particularly, when the mark length recording format is used, an edge shift must be suppressed.

Further, since the optical disk is a compatible medium, better system conditions are to maintain a compatibility between the media or a compatibility between the apparatus. As described above, the magneto-optical disk are individually different in recording conditions, such as optimum recording power, erasing power or the like. Therefore, in order to keep compatibility between the media and between the apparatus, there have heretofore been proposed the following methods. That is, points at which recording conditions and so on are recorded on the control track of the disk are defined on the ISO standard in advance to thereby maintain a compatibility between the disks. Also, a standard disk for calibrating recording power is prepared in advance for an apparatus used, and a disk whose recording power is determined by the relative comparison of the disk with the standard disk is manufactured.

On the other hand, when data is recorded by using the mark length recording system as a data recording system, a shift amount of a mark edge is corrected under the control of signal. In particular, in the case of the heat flow generated within the recording medium and the magneto-optical recording, the control of the magnetic characteristic exerts a large influence upon the shift amount of the mark edge position, as earlier noted. In the mark length recording, information is recorded on the basis of the length of the mark formed so that the shift amount of the mark edge position is directly related to the high density recording and the high accuracy recording.

In order to solve the aforesaid problems, there is known the following examples according to the prior art.

JP-A-3-22223 realizes a control technique in which a magnetic domain shape is controlled with high accuracy by controlling the shape of the recording waveform. To be more concrete, a code string of the recording mark is converted into pulses and a series of pulse string corresponding to the length of the recording code string is formed. Then, the length and amplitude of the pulse string are controlled in response to the length of the opposite phase of the recording code string. Thereafter, the pulse string is separated into three portions and data is recorded by changing the pulse width of each pulse.

In the above-mentioned technique according to the prior art, adequate accuracy required when the shape of the recording magnetic domain is controlled in order to realize a recording capacity of high density is not always obtained. Consequently, an error of the magnetic domain shape is observed as the edge shift, which causes an error frequently. This is a large hindrance encountered when the ultra-high density recording is realized by using the mark length recording system.

Further, when an ambient temperature is fluctuated or an interference occurs between data patterns, then a desired magnetic domain shape cannot be obtained, which causes the edge shift and the error. Therefore, it is impossible for the above-mentioned conventional technique to obtain reliability.

JP-A-4-265522 describes a technique in which information is recorded without being affected by the mark edge position shift and the information thus recorded is reproduced. To this end, a constant pattern is recorded on a disk as an initial operation and the edge position shift is detected by reproducing the recorded constant pattern. Then, an information reproduced signal is shifted on the basis of the detected shift amount. In particular, JP-A-4-265522 describes a technique proposed on the recording medium side and on the apparatus side so as to realize a compatibility. However, when the apparatus treats a recording medium having an unspecified recording condition, the apparatus must allow an error signal of a certain extent occurred when data is recorded or reproduced. Accordingly, when the recording density of the recording medium is increased, a tolerance of the above-mentioned error signal is reduced so that the high density recording cannot be substantially achieved by the recording medium having a compatibility. In particular, when data is recorded by using the mark length recording system while the track pitch is reduced or the bit pitch is reduced, an influence of a thermal interference between the pits is large and a compatibility cannot be maintained. The reason for this is as follows. That is, a heat characteristic of the disk is different so that controllability, in particular, control accuracy of the mark to be formed is different.

An object of the present invention is to provide a recording control method of a magneto-optical recording in which disadvantages, such as fluctuation of ambient temperature and interference between patterns can be eliminated and in which a very small magnetic domain suitable for effecting a mark edge recording can be formed stably.

Another object of the present invention is to provide a recording control method of a magneto-optical recording in which information can be recorded or reproduced with high density and with high accuracy.

A further object of the present invention is to provide a recording control method of a magneto-optical recording in which a recording magnetic domain of desired width and length can be obtained.

SUMMARY OF THE INVENTION

In order to achieve the aforesaid objects, there is provided a magneto-optical recording in which information is recorded, reproduced or erased by using at least a laser light and an externally-applied magnetic field. When an optimum recording condition is found out before data is recorded in order to constantly obtain the same information mark shape, a test recording of a constant data pattern is effected on the disk, whereafter the test-recorded disk is reproduced. Then, at least either of a data recording pulse width value and a laser power value is controlled on the basis of the reproduced result.

Further, according to the present invention, a recording pulse waveform used in the recording is comprised of power levels of at least three kinds of lasers. Then, information is magneto-optically recorded by controlling lasers powers such that set values of these power levels become predetermined ones or ratios within predetermined ranges.

The laser power levels of three kinds are formed of a read-out level, an intermediate level and a recording level, and a ratio between the intermediate level and the recording level is set to be a constant value.

When the recording level is separated into two kinds of power levels of a first recording level and a second recording level, information is magneto-optically recorded by controlling the power levels such that a ratio between the intermediate level and the first and second recording levels falls within a predetermined range and that a ratio between the first recording level and the second recording level falls within a predetermined range.

Ratios of a plurality of laser powers express gradients in which heat is flowed through the recording medium. Therefore, even when the environment in which the magneto-optical recording is used is changed, if the ratio between the laser powers is kept constant, then a heat flow can constantly maintain the same state. If the ratio between the plurality of laser powers is suppressed to be constant as described above, the heat flow within the recording medium can be made constant independently of the structure of the recording medium. Further, if the laser power ratio is kept within a predetermined range, then a detected signal can be suppressed within an error range corresponding to a fluctuation range thereof. Furthermore, even when a heat flow is changed dependent on the disk structure, if an optimum recording condition is found out, then a compatibility of disk can be secured and a magnetic domain shape can be controlled with high accuracy.

To realize a high density recording, a mark length recording is an effective method. In that case, it is important that a length of a magnetic domain to be formed is controlled with a high accuracy. As described hereinbefore, if the ambient temperature of the apparatus is fluctuated, then the edge shift in which the edge position is fluctuated takes place and an error occurs. To suppress the occurrence of the edge shift, the laser power and the pulse width must be controlled so that the ambient temperature becomes the same temperature for the disk apparently.

The recording control method according to the present invention employs pulses formed of at least three portions as a shape of laser pulse used in the recording. More specifically, these pulses are comprised of a plurality of power levels. An intermediate level is used to control a heat flow in the disk, such as when a recording film is pre-heated. The intermediate level is controlled so that the temperature of the disk constantly becomes a constant temperature independently of the ambient temperature. Incidentally, a recording is carried out at the recording level.

The pulses that construct the recording level employ those separated into pulse groups formed of a plurality of fine pulses. A shape of this fine pulse can heat a local portion of the recording film, and suppress the diffusion of a heat to the surroundings. As a consequence, a thermal interference can be avoided, and a very small magnetic domain can be formed by reducing the pitch of bits. The recording control method of the present invention is suitable for the high density recording.

When the mark length recording is effected, the pulses that constitute the above-mentioned recording level are comprised of a leading pulse portion used for recording the shortest data pattern and the succeeding pulse used for recording a longer data pattern. A set power of the recording level may set by setting the height (power) of the leading pulse and that of the succeeding pulse to be the same or by setting different powers. Alternatively, the pulse width may be selected arbitrarily.

A case that the leading pulse and the succeeding pulse which constitute the recording level are the same in power will be described more specifically. Initially, the intermediate level is fluctuated in response to the ambient temperature. The fluctuation of the ambient temperature is detected by the change of a signal amplitude or the like obtained when a predetermined test pattern that had been recorded on the test area of the disk is reproduced. A method of setting the optimum recording condition on the basis of the detected results is an important element herein.

To effect the high density recording, a power, a pulse width and a pulse interval of pulses that constitute the recording level must be controlled with a high accuracy. To this end, there must be used a method that can determine the recording conditions with ease. It is an effective method for setting the intermediate level and the recording level so that they are held at a constant ratio. With the above-mentioned method, if one level is set, then the other level is automatically determined in a proportional distribution fashion. That is, one of the most important factors that must be taken into consideration when the recording level exceeds the intermediate level due to the fluctuation of temperature is to keep a ratio between the intermediate level and the recording level constant.

The value of the above-mentioned ratio is not changed by the environmental conditions such as the temperature or the like but changed when the heat flow is changed because of different structures of the disks. Also, the recording level may be returned again to the intermediate level after passing the read-out level which is lower than the intermediate level before being moved to the intermediate level after the pulse of the recording level had been irradiated on the disk. This control operation is effective for removing an interference between the adjacent pits.

A heat that had been applied to the recording film in the read-out level area is cooled, and a pre-heat power is radiated on the disk so that a cooling speed of heat is decreased. Then, from a certain time, a temperature of the recording film becomes constant. Because the heat flow amount from the pulse is changed to the fluctuation of the ambient temperature and the cooling speed is changed, the temperature of the recording film may be balanced by fluctuating the pre-heat power supplied to the recording film.

Therefore, a fluctuation occurred in the magnetic domain shape when the external conditions are fluctuated can be controlled. Also in this case, it is preferable that the ratio between the intermediate level and the recording level may be kept constant, which is equivalent to the operation that the heat flow within the recording medium is made constant. As described above, when the power is set such that the ratio between the intermediate level and the recording level is kept constant, the magnetic domain shape can be controlled with increased accuracy and the arrangement of the apparatus can be simplified.

The case that the pulse that constructs the recording level is separated into a plurality of pulses will be described. Herein, the recording level is comprised of a first recording level and a second recording level.

With respect to the laser power of the recording pulse waveform that is used in the recording, a ratio between the intermediate level and a first recording level (e.g., high power level) in a plurality of recording levels is set to be larger than 1.50 and smaller than 1.80. A ratio between the intermediate level and a second recording level (e.g., low power level) in a plurality of recording levels is set to be larger than 1.5 and smaller than 1.80. Also, a ratio between the first recording level and the second recording level is set to be smaller than 1.0 and larger than 0.90. Information is recorded on the disk by fine pulse groups having waveforms generated at a constant interval. According to the present invention, the level of the leading pulse of the fine pulse groups is used as the first recording level, and the level of the succeeding pulse is used as the second recording level. Further, the level between at least one information code and another information code is used as the intermediate level, and a constant period provided immediately after the recording pulse of one information code is ended is used as the read-put level. Incidentally, according to the present invention, the level between the recording pulses also is used as the intermediate level.

When information is recorded on the disk, if a signal having a recording pulse width or gap of an integral multiple or an inverse of an integral multiple of a write clock of the disk drive apparatus is used in the waveform generated when the fine pulses are held at a constant interval, a signal of high accuracy can be obtained by a simple method from an apparatus manufacturing standpoint. As a consequence, the cost of the apparatus can be reduced and the width and length of the recording magnetic domain can be controlled with increased accuracy, whereby the mark length recording can be realized. In the recording waveform of the above-mentioned shape, it is preferable that the pulse width of the leading pulse and the pulse width of the succeeding pulse are different. Predominantly, it is preferable that the pulse width of the leading pulse is set to be wider than that of the succeeding pulse. It is needless to say that the signal whose pulse width is selected to be an integral multiple of or an inverse of an integral multiple of the write clock of the disk drive apparatus is used as a reference clock. Also, it is needless to say that, when information is recorded on the disk, the recording level is formed of fine pulses and the interval between the pulses is made equal. Predominantly, it is also needless to say that the interval between the pulses is set to be an integral multiple of or of an inverse of an integral multiple of the write clock of the disk drive apparatus. Further, it is preferable that, in a modulation system used when information is recorded on the disk, or when an edge portion having information is recorded, the shortest recording magnetic domain is not formed of a plurality of pulses but formed of a single pulse in the set of the above-mentioned fine pulses. To this end, it is sufficient that at least one of the pulse width and the laser power is controlled. When the pattern of the recording magnetic domain is longer, pulses of two combinations are added to the first pulse in response to the length corresponding to the code to be recorded by some suitable methods, such as to hold the second recording level synchronized with the write clock during a constant period after the intermediate level of the constant period synchronized with the write clock. With this arrangement, the magnetic domain width and the magnetic domain length can be controlled with a high accuracy for any types of the patterns. In particular, the magnetic domain width is the same for both the long pattern and the short pattern and has a large effect in suppressing the edge shift in the mark length recording.

It is customary that the magneto-optical disk apparatus is not always utilized in the same environmental condition but the environmental condition that the magneto-optical disk apparatus is utilized is fluctuated. In this case, when the temperature is fluctuated in the environment, i.e., the temperature becomes high, the width and length of the magnetic domain that will be formed also are increased. Conversely, when the ambient temperature becomes low, the width and length of the magnetic domain that will be formed also are decreased. At any rate, such fluctuations of the width and length of the magnetic domain are observed as edge shifts, which causes an error. According to the present invention, when information is recorded on the disk, the test recording needed for detecting the fluctuation of the recording condition is carried out at a constant time interval, upon disk loading or when a recording command is executed. Then, the optimum condition is found out from the detected result and the recording is effected by using the optimum recording condition. To set the recording condition, the recording laser power is changed in the test recording. As the laser power, there are prepared at least four kinds of levels. When the test recording is carried out, information is recorded or erased by controlling the laser power dependent upon the ambient temperature and the structure of the disk used therein. At that time, it is preferable that the levels of the laser power that is used at least in the recording is formed of at least the read-out level, the intermediate level and a plurality of recording levels and that the ratio between the intermediate level and the recording level falls within a constant range dependent on the ambient temperature and the structure of the disk used therein. Better results can be obtained if the laser power, i.e., the power level ratio is controlled as follows: A ratio between the intermediate level and the first recording level (high power level) in a plurality of recording levels is set to be larger than 1.50 and smaller than 1.80; a ratio between the intermediate level and the second recording level (low power level) in a plurality of recording levels is set to be larger than 1.50 and smaller than 1.80; and a ratio between the first recording level and the second recording level is set to be smaller than 1.0 and larger than 0.9.

The aforesaid recording control system is suitably applied to the mark length recording system in which information is given on the edge portion of the mark to be formed. In this mark length recording system, a width and length of a mark (i.e., domain) that is formed on the disk must be controlled with high accuracy. In that case, it is important to constantly control a position shift of the leading and trailing edges of the mark edge having information. From an optical disk recording theory standpoint, a heat and the disk are closely related to each other, and the control of the heat applied to the disk considerably affects the recording accuracy. However, disks have different heat characteristics so that recording conditions are different dependent on disks. Therefore, according to the present invention, when the magneto-optical recording apparatus is operated, such as loading the disk or the like, the disk recording characteristic is evaluated by a predetermined test pattern and the recording condition onto the disk is determined on the basis of the evaluated result. In order to found out the optimum recording condition under which information is recorded on the disk, a constant pulse corresponding to the modulation system and which is used at a reference position of an arbitrary track is generated as a constant data pattern and then a first domain is formed on the disk. A constant pulse corresponding to the modulation system used therein is generated at the position that is spaced apart by a constant distance from the position in which the first domain is formed so that the occurrence of the thermal interference can be avoided, thereby a second domain being formed on the disk. A gap portion between the first domain and the second domain is used as a reference clock. Further, a constant pulse corresponding to the modulation system is generated at the position spaced part from these positions by a constant distance to thereby record a third domain on the disk. Furthermore, a constant pulse corresponding to the modulation system used therein is generated at the position spaced apart from the third domain by a certain distance to thereby record a fourth domain on the disk. A distance between at least the third and fourth domains is measured by reproducing the recorded domains and at least one of the value of the recording pulse width of user data and the value of the laser power is controlled on the basis of the measured result.

Alternatively, in the test pattern recorded on the disk, the distance between the third and fourth domains and the length of the fourth domain also may be measured by reproducing the recorded domains, and one of the value of the recording pulse width of user data and the value of the laser power may be controlled on the basis of the measured results.

Preferably, domains may be recorded while the distance between the third and fourth domains may be changed in correspondence with the modulation system used therein, whereafter recorded domains may be reproduced similarly. Then, at least one of the value of the recording pulse width of user data and the value of the laser power may be controlled on the basis of the measured result.

More preferably, when the constant test pattern is recorded on the disk, data may be recorded while the recording laser power is changed, and the data thus recorded may be reproduced. Then, at least one of the value of the recording pulse width of user data and the value of the laser power may be controlled such that a constant signal amplitude may be obtained independent of the data pattern.

It is preferable that a recording waveform formed of fine pulses is used as a shape of a laser pulse that is used when the constant test pattern is recorded on the disk. The recording waveform used herein is not limited to the above-mentioned recording waveform formed of the fine pulses, and may be a recording waveform of the same shape as that of a waveform that is used to record data. When data is recorded under the recording condition determined by using the above-mentioned evaluated result, regardless of the types of the disks, the magnetic domain of the same shape can be formed an the high density recording can be realized. This effect is not limited to the magneto-optical recording and can, of course, be applied to a phase change type optical disk and a write once optical disk.

Because the recording/reproduction is effected by using the constant pattern and the optimum recording condition on the disk to be recorded is found out as described above, regardless of the types of the disks, the magnetic domain of the same shape can be formed. Therefore, a compatibility of disks can be secured and the shape of the magnetic domain can be controlled with a high accuracy. As a consequence, the mark length recording system becomes possible, and hence the ultra-high density optical recording can be realized.

BRIEF DESCRIPTION OF THE DRAWINGS

FIG. 1 is a flowchart showing an algorithm needed for effecting a test recording;

FIG. 2 is a schematic diagram showing a test pattern of a recording beam power;

FIGS. 15A through 15N are timing charts showing processes in which a unit recording pulse is formed, respectively.

DESCRIPTION OF THE PREFERRED EMBODIMENTS

Embodiments of the present invention will hereinafter be described with reference to the drawings.

Initially, an embodiment using one kind of a recording level according to the present invention will be described.

A disk used in this embodiment is formed by continuously laminating a film formed of SiNx(60 nm)/TbFeCoNb(25 nm)SiNx(10 nm)/AlTi(40 nm) on a plastic substrate. After the surface was coated with a UV curing resin, one disk was formed by bonding two disks.

A test recording was effected on the resultant disk according to the algorithm shown in FIG. 1. A test pattern of a recording beam power used at that time was illustrated in FIG. 2. Having used this recording beam power test pattern, a thermal interference between the pits was detected and the changes of magnetic domain width and magnetic domain length were detected according to the following procedure.

The normal recording conditions will be described below.

Figure 3:
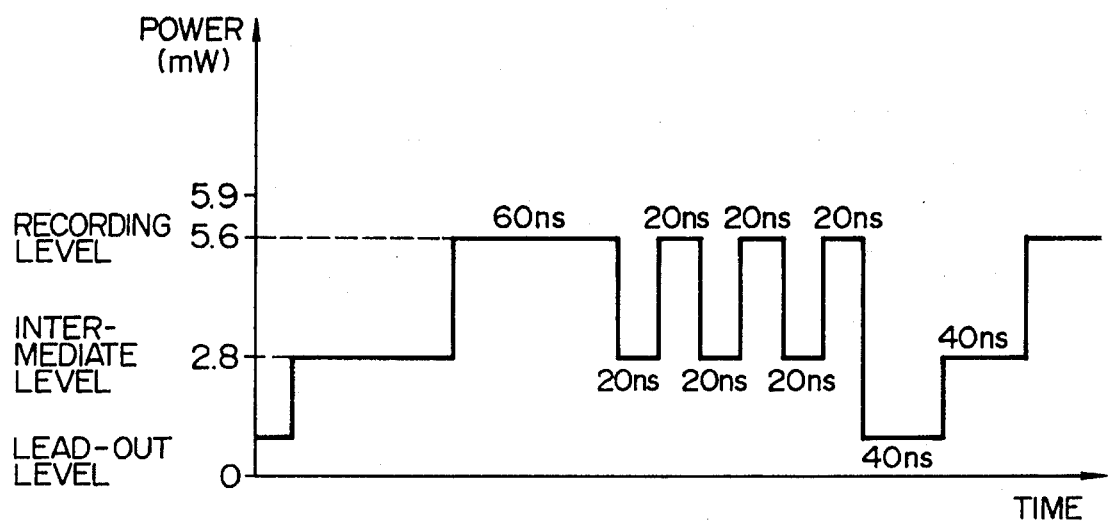
FIG. 3 is a diagram showing a waveform of a recording pulse.

The above-mentioned disk was used and the recording was effected by using a recording pulse waveform shown in FIG. 3. In the recording, the mark edge recording format and the zone CAV recording format were used together, and the recording was effected according to a (1, 7) RLL (run length limited) modulation system. A temperature of the disk was 25° C.

At that time, a width of a formed magnetic domain was 0.7 μm. The longest length of the magnetic domain or gap was 3 μm and the shortest length thereof was 0.75 μm. A ratio of the recording level/intermediate level was set to 2/1. More specifically, a power of the intermediate level of the pulse was 2.8 mW, and a power of a recording level was 5.6 mW. When an edge shift amount at that time was measured, the edge shift amount was less than μ1.5 ns independent of the data pattern.

Subsequently, the test recording was carried out by using the pattern shown in FIG. 2 in accordance with the algorithm shown in FIG. 1. The disk was left at a temperature of 50° C.

Having studied the recording conditions for forming a magnetic domain of the size similar to the above-mentioned size by setting the ratio of the recording level/intermediate level to 2/1 and by changing the laser power, the intermediate level of the necessary laser power was 1.8 mW, and the recording level was 3.6 mW. Conversely, having studied the optimum recording condition by the similar method while the temperature was decreased to 0° C. the intermediate level was 3.8 mW, and the recording level was 7.6 mW.

As described above, having changed the values of the respective levels while the level ratio was kept constant, the optimum conditions were found out. When the edge shift amounts at respective temperatures were measured, the edge shift amounts were less than ±1.5 ns at any temperature independent of the data pattern.

Figure 4:
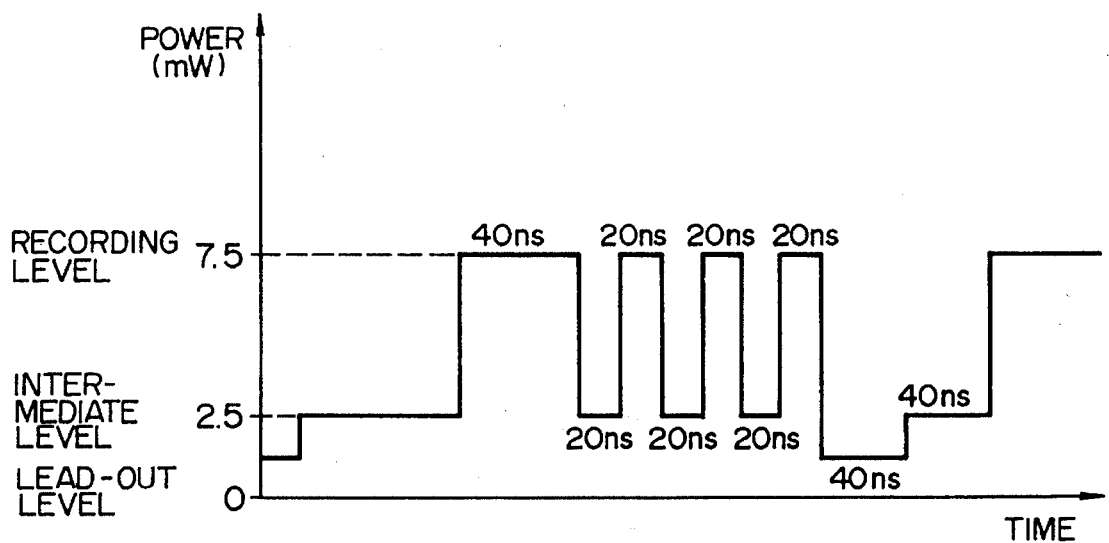
FIG. 4 is a diagram showing a waveform of a recording pulse.

Then, the above-mentioned similar measurements were effected on a disk that is formed by continuously laminating a film having a structure of SiNx(75 nm)/TbFeCoNb(30 nm)/SiNx(5 nm)/CuNi(40 nm) on a poly-carbonate substrate according to the sputtering method. FIG. 4 shows a waveform of a pulse used therein. The optimum recording condition was studied by using the test pattern shown in FIG. 2.

The ratio of the recording/intermediate level was set to 3/1. The values of laser powers at that time were such that the intermediate level was 2.5 mW and the recording level was 7.5 mW at a temperature of 25° C., the intermediate level was 2.0 mW and the recording level was 6.0 mW at a temperature of 50° C. and that the intermediate level was 3.0 mW and the recording level was 9.0 mW at a temperature of 0° C.

Study of the measured results reveal that, although the ratio between the intermediate level and the recording level is different depending on the disk structure the high accuracy recording is made possible by setting the ratio between the recording level and the intermediate level to be constant.

Figure 6:
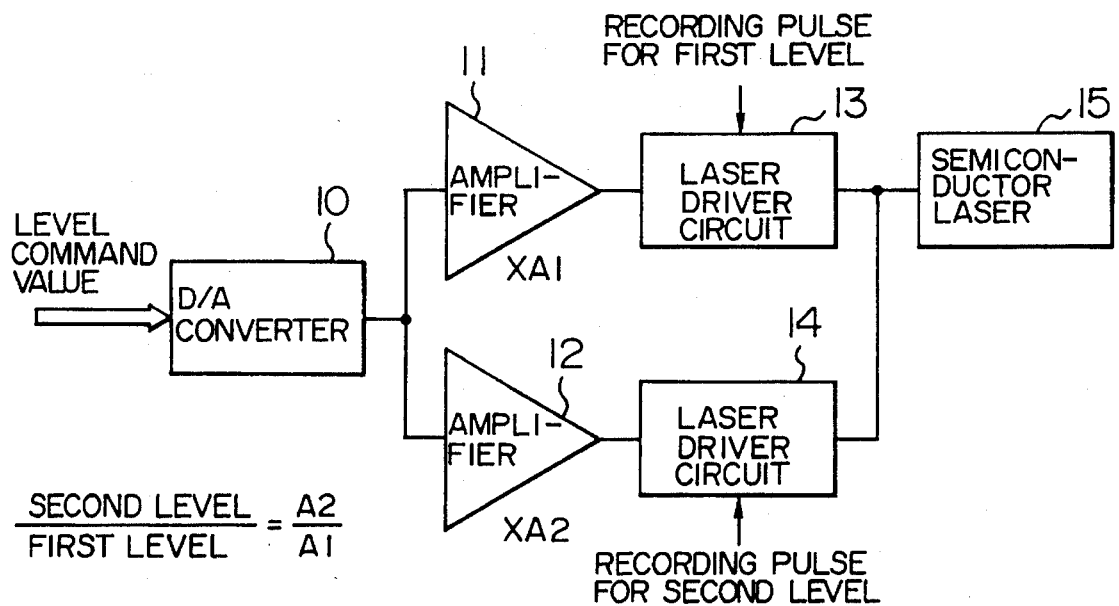
FIG. 6 is a schematic fragmentary block diagram showing a circuit arrangement of a power control circuit according to the present invention.

The ratio between the recording level and the intermediate level can be determined with ease and adjusted by using the control circuit shown in FIG. 6.

Figure 5:
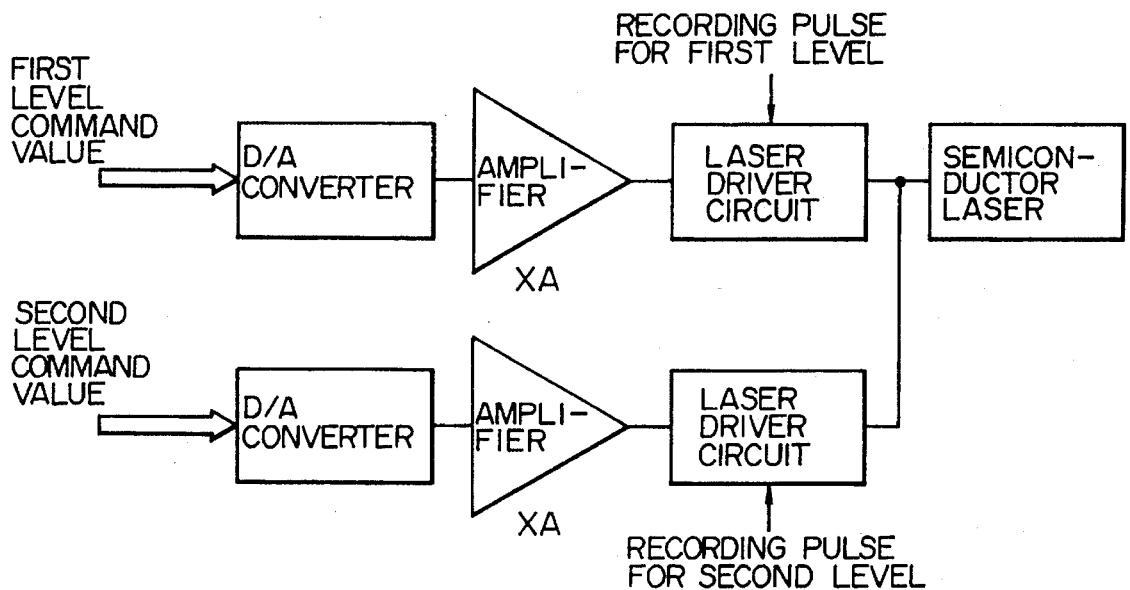
FIG. 5 is a schematic fragmentary block diagram showing a circuit arrangement of a conventional power control circuit.

FIG. 5 shows an example of a circuit arrangement that realizes a power control mechanism according to the prior-art. Study of FIG. 5 reveals that the conventional circuit arrangement needs D/A (digital-to-analog) converters associated with respective power levels. In other words, according to the conventional power control mechanism, several laser powers are controlled by separate power control mechanisms.

However, according to the present invention, as shown in FIG. 6, the ratio between the recording level and the intermediate level can be determined with ease by a control circuit using one D/A converter and adjusted thereby. As shown in FIG. 6, a predetermined level ratio is set by two amplifiers 11 and 12 having different amplification factors. A level command value which is changed depending upon characteristics such as a disk or the like is input from a D/A converter 10 and a semiconductor laser 15 is driven by outputs from the respective amplifiers 11, 12 through laser driver circuits 13, 14.

The fluctuation of a magnetic domain shape can be controlled by controlling the laser power level of a recording laser pulse by using the above-mentioned level ratio control circuit, as earlier noted. Further, according to the recording control method of the present invention, the apparatus having a high control accuracy can be realized by elements less than the prior art.

According to the above-mentioned embodiment, in the recording method having a plurality of recording levels, by setting the ratios of respective power levels to constant values, the accuracy in the recording control operation can be increased considerably, and a disk drive apparatus can be manufactured inexpensively. In addition, by holding each laser power level of the recording pulse at constant ratio, a durability against the fluctuation of external ambient conditions such as the fluctuation of the ambient temperature or the like can be increased, and the change of the shape of the magnetic domain can be suppressed. Examining the edge, the edge shift amount can be suppressed to be less than ±1.5 ns. Therefore, the power control circuit of the present invention is suitable for the above-mentioned mark length recording and a high density recording can be realized.

Operation executed when there are two recording levels, i.e., a first recording level and a second recording level will be described.

Figure 7:
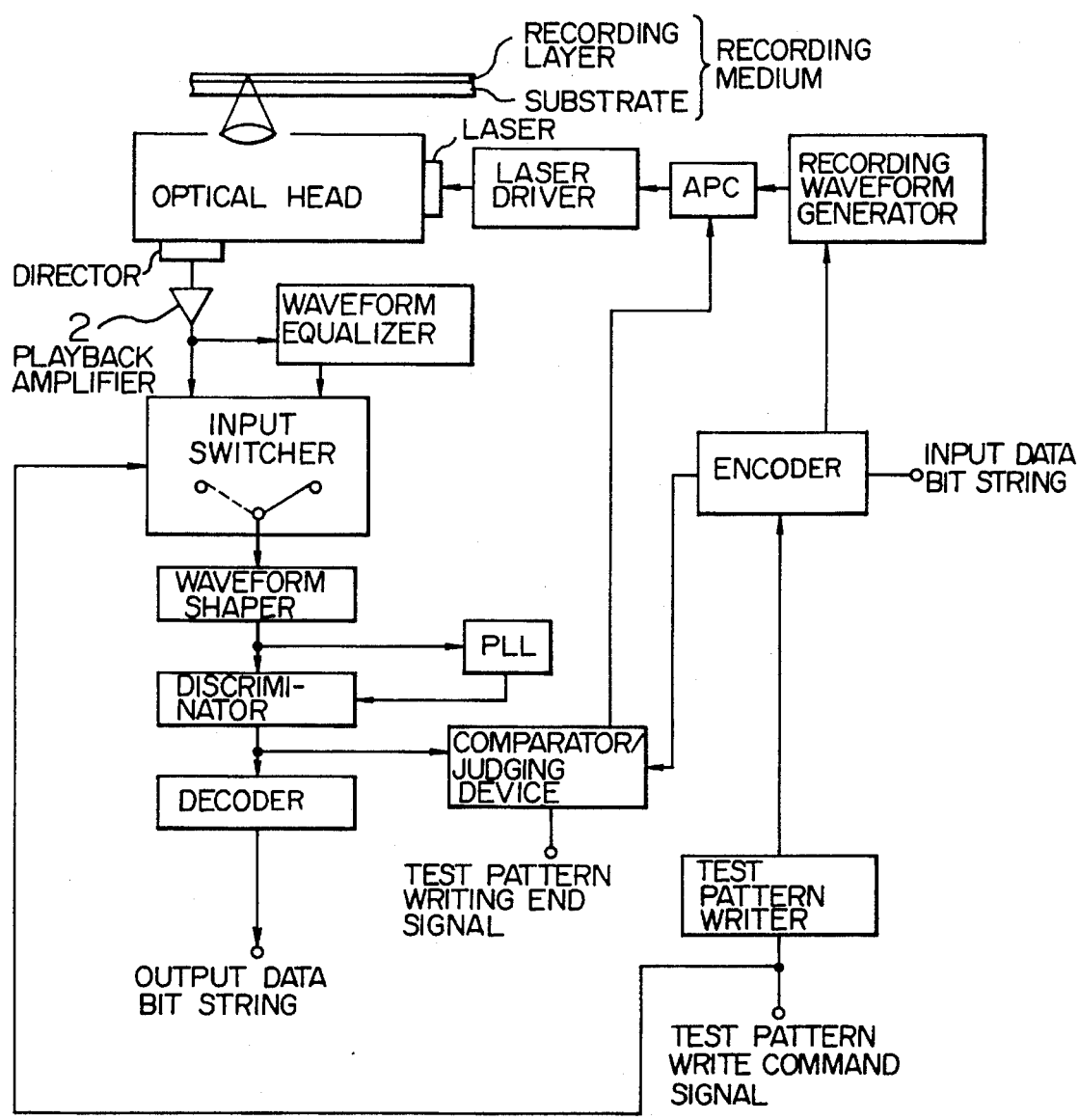
FIG. 7 is a block diagram showing a magneto-optical disk apparatus according to the present invention.

FIG. 7 shows an example of a magneto-optical recording apparatus used in the present invention.

Figure 8:
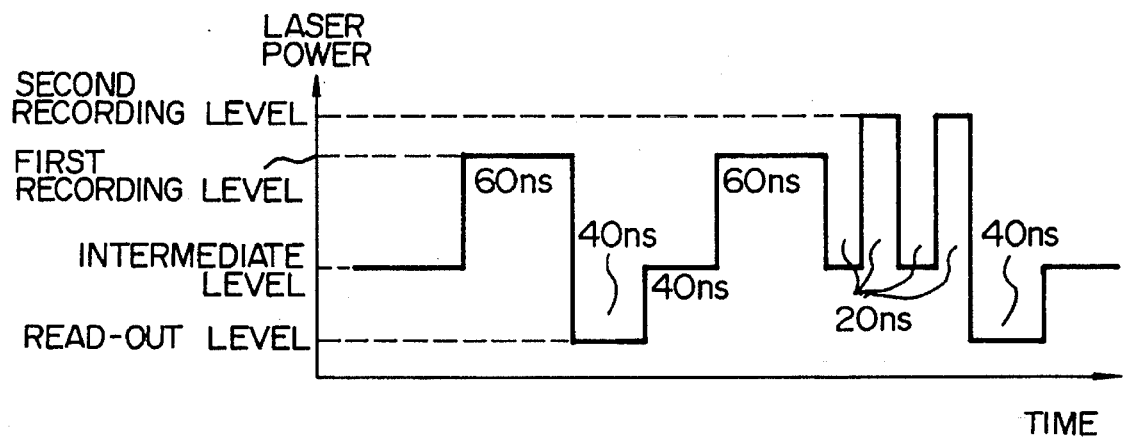
FIG. 8 is a diagram showing a waveform of a recording pulse used in the present invention.

With this magneto-optical recording apparatus, the recording was effected on the disk by using a recording waveform pulse shown in FIG. 8. The recording waveform has four power levels. Reference symbol Pr depicts a read-out level which is set to 1.5 mW in this embodiment. Reference symbol Pas depicts an intermediate level whose power value is determined depending upon the disk structure. A recording level is comprised of a first recording level Pw1 and a second recording level Pw2. The values of the first and second recording levels Pw1 and Pw2 are different depending on the disk structure similarly to the intermediate level Pas. The following table 1 shows measured results of respective values of the read-out level Pr, the intermediate level Pas, the first recording level Pw1 and the second level recording level Pw2 with respect to five kinds of media (DISK1 to DISK5) which are different in disk structure, respectively.

TABLE 1

RELATIONSHIP AMONG INTERMEDIATE LEVEL
AND RESPECTIVE RECORDING LEVELS

| | Pas (mW) | Pw1 (mW) | Pw2 (mW) | Pw1/Pas | Pw2/Pas | Pw1/Pw2 |
|---|---|---|---|---|---|---|
| DISK1 | 3.51 | 5.45 | 5.71 | 1.55 | 1.63 | 0.95 |
| DISK2 | 3.37 | 5.69 | 6.03 | 1.69 | 1.79 | 0.94 |
| DISK3 | 3.51 | 5.31 | 5.31 | 1.51 | 1.51 | 1.00 |
| DISK4 | 4.53 | 7.43 | 7.57 | 1.64 | 1.67 | 0.98 |
| DISK5 | 3.45 | 5.69 | 5.97 | 1.65 | 1.73 | 0.95 |

Study of the table 1 reveals that respective ratios of Pw1/Pas, Pw2/Pas and Pw1/Pw2 indicate substantially similar values. Values of the ratios of Pw1/Pas and Pw2/Pas both fall in a range of from 1.50 to 1.80. Also, the ratio of Pw1/Pw2 falls in a range of from 0.9 to 1.0. Then, random patterns were recorded on the disks under the condition that respective power levels were set in these ranges.

The modulation system used herein was (1, 7) RLL system. Also, the disk driving conditions were such that the disk rotational speed was 3,000 r.p.m., the disk recording position r was set to 30 mm and that a recording laser wavelength was set to 780 nm, respectively.

Power levels, such as the recording powers or the like were set by the above-mentioned power ratios, and then the recording was effected. Then, when the edge shift amount was measured, the value of the edge shift amount could be suppressed to be less than 2 ns. Further, when a jitter distribution was calculated, a jitter distribution versus window ratio could be suppressed to be less than 40% ($10^5$ samples) without a PLL (phase-locked loop) operation. This value is equivalent to the accuracy of the length of ±0.02 μm in view of the magnetic domain length. Further, from the observed results of the magnetic domain, it is appreciated that the recording laser power can be controlled with a accuracy of a magnetic domain width of less than ±0.05 μm.

Although the absolute values of the recording laser powers are different as described above, the magnetic domain shape could be controlled with a high accuracy with respect to only the disks whose power level ratios fall within the above-mentioned constant ranges.

As comparative examples, the recording was effected on comparative disks having structures different from those of the above-mentioned disks under the condition that the intermediate level Pas=2.95 mW, the first recording level Pw1=1.6 mW and that the second recording level Pw2=6.1 mW, wherein Pw1/Pas= Pw2/Pas=2.07 and Pw1/Pw2=1.0, respectively. As a result, the edge shift amount was 15 ns. When the jitter distribution was calculated, then the jitter distribution versus window ratio was about 80% ($10^5$ samples). Having considered various margins, it is clear that a recording density of 1 GB in the 5.25-inch single-sided disk cannot be realized without difficulty. Therefore, it can be understood that the present invention is effective for achieving the high density recording.

The embodiments in which the power level ratios were set respectively have been described so far.

The evaluation of the recording pattern and the process for forming the unit recording pulse will be described below.

The test recordings were carried out by using the recording patterns shown in FIGS. 9A through 9F, respectively. These recording patterns were already modulated (e.g., (1, 7) RLL modulation), and the pulse width and the gap width were illustrated in numerical values in FIGS. 9A through 9F. One unit of these numerical values represents a time Tw which is about 40 ns at the innermost periphery of the disk when the disk rotational speed is 3,000 r.p.m., i.e., Tw=40 [ns].

Figure 9A:
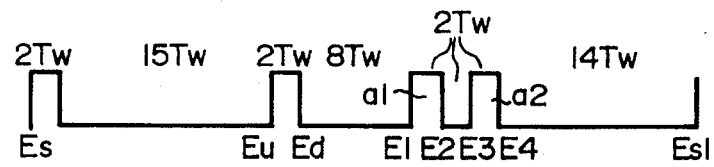
FIGS. 9A through 9G are schematic diagrams showing examples of a rest recording pattern and a recording pulse, respectively.

The evaluation of the recording pattern and the process for forming the unit recording pulse will be described initially with reference to FIG. 9A. As shown in FIG. 9A, a single pulse having a leading edge Eu and a time 2Tw is generated between a single pulse having a leading edge Es and a time 2Tw. These single pulses are used to remove the preceding recording states.

After the standard state in which the influence of the preceding recording state was removed is presented, behind a gap of a time 8Tw, there is generated a single pulse al having a leading edge $E_1$, a trailing edge $E_2$ and a time 2Tw. Further, behind a gap having a time 2Tw, there is generated a single pulse al having a leading edge $E_3$, a trailing edge $E_4$ and a time 2Tw.

Figure 10:
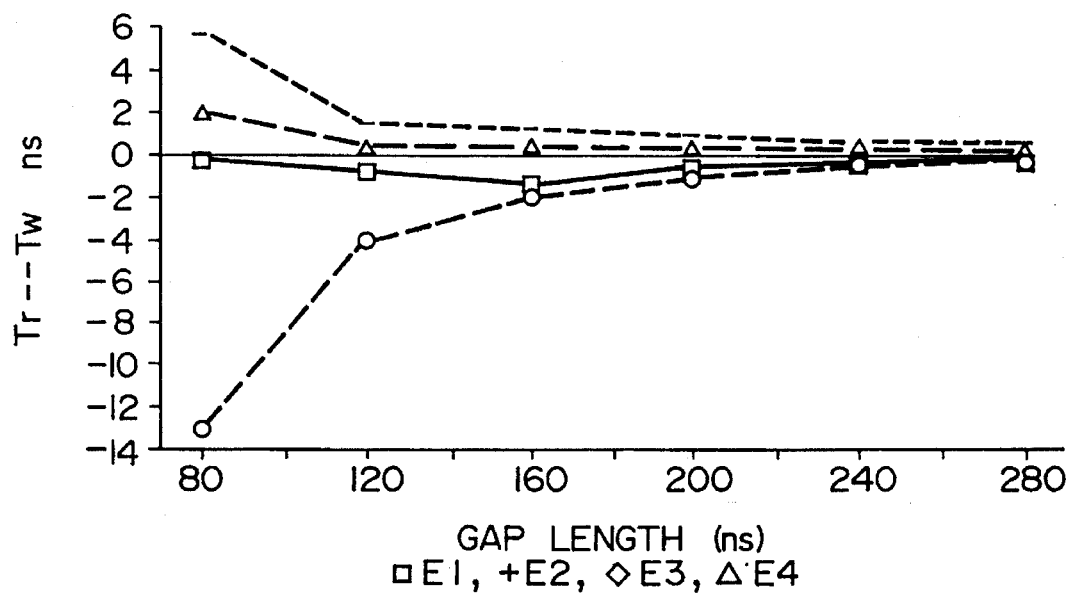
FIG. 10 is a graph showing measured results of edge shifts of recording patterns recorded in accordance with FIGS. 9A through 9G.

FIG. 10 shows measured results of a gap length between the single pulses a1, a2, and the shift amounts of the leading edge and the trailing edge after the pattern, which had been recorded by the combination of the single pulses and the gap amounts, was reproduced.

Figure 9B:
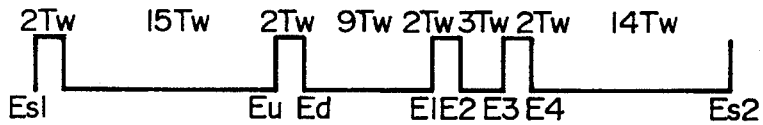
Figure 9C:
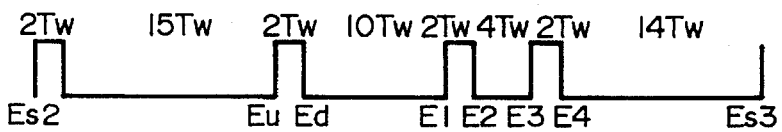
Figure 9D:
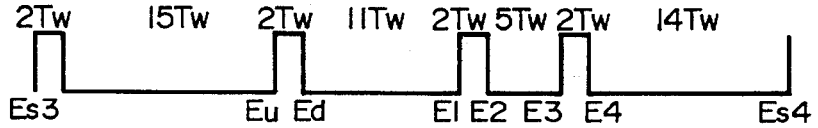
Figure 9E:
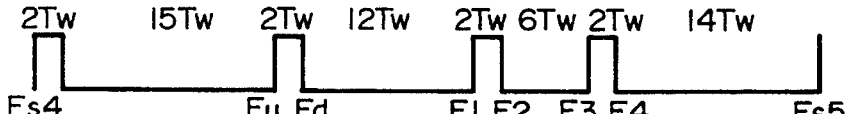
Figure 9F:
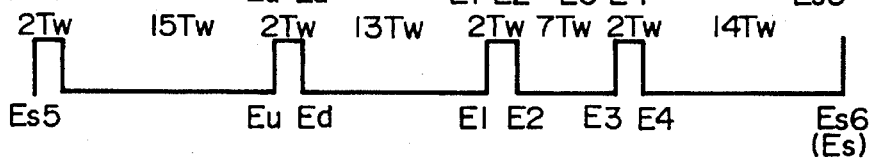

In FIG. 10, a point corresponding to the gap amount between the single pulses a1 and a2 in FIG. 9A is a point plotted on the abscissa 80 ns because the gap amount is 2Tw. Because the gap amount between the single pulses a1 and a2 in FIG. 9B is 3T, a corresponding point in FIG. 10 is a point of 120 ns plotted on the abscissa. Similarly, FIG. 9C shows a point of 160 ns, FIG. 9D shows a point of 200 ns, FIG. 9E shows a point of 240 ns, and FIG. 9F shows a point of 280 ns, respectively.

In FIG. 10, an ordinate Tr−Tw indicates an edge position shift time in the recording and reproducing at leading edge and trailing edge positions (E1, E2, E3, E4) Of the single pulses a1 and a2. More specifically, if the reproducing edge position is equal to the recording edge position, then Tr−Tw=0. If the reproducing edge position is advanced from the recording edge position, then Tr−Tw<0. If the reproducing edge position is delayed from the recording edge position, then Tr−Tw>0.

Comparing the measured results of FIG. 10 with the leading edge and trailing edge positions E1, E2, E3, E4 of FIG. 9A, it is appreciated that the single pulses a1, a2 affect each other and a gap length between the single pulses a1 and a2 cannot maintain the time 2Tw.

Figure 9G:
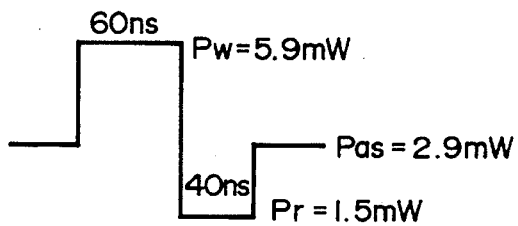

The reason for this is that an extra heat is applied to the gap due to the heat generated by the single pulses a1, a2. A shape of a recording pulse is selected to be such one as shown in FIG. 9G in order to form a recording pit which is apparently free from the heat upon playback.

More specifically, the recording laser power level is raised to the recording level Pw, returned to the read-out level Pr after ½ Tw and holds the intermediate level Pas after time Tw. Reference symbol Pas designates an auxiliary power level given such that a thermal interference action is made constant regardless of the adjacent recording pit interval provided by the recording level Pw.

The auxiliary power level Pas is determined as follows, for example. When the recording pattern shown in FIG. 9A is recorded by using the single pulse and then the recorded pattern is reproduced, the edge position shift amount shown in FIG. 10 can be obtained. Then, a table for the auxiliary power level Pas corresponding to the edge position shift amount is stored in some suitable means, such as a memory or the like and the auxiliary power level value Pas that can minimize the Tr–Tw value is selected therefrom.

Other method records a plurality of recording patterns shown in FIG. 9A at arbitrary positions on the disk while the intermediate level Pas is being changed in a range of from Pr to Pw. These patterns are reproduced, the Tr–Tw value is measured in accordance with FIG. 10 and the intermediate level Pas in which the Tr–Tw value may be minimized is selected.

In order to further increase the recording accuracy, the recording patterns shown in FIGS. 9B through 9F, for example, are recorded and reproduced and measured results shown in FIG. 10 are obtained. Subsequently, the intermediate level Pas may be obtained by the above-mentioned method on the basis of the measured results.

A further embodiment in which the mark length recording is carried out by the recording pulse shape shown in FIG. 9G will be described next.

In accordance with the mark length recording, the recording pattern length is not constant so that the Tr–Tw value at the trailing edge portion of the recording pattern length, in particular, is fluctuated considerably. To solve this problem, there is utilized a recording pulse structure shown in FIG. 11H.

Figure 11A:
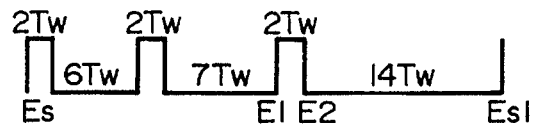
FIGS. 11A through 11I are schematic diagrams showing examples of a test recording pattern and a recording pulse used in the present invention, respectively.
Figure 11B:
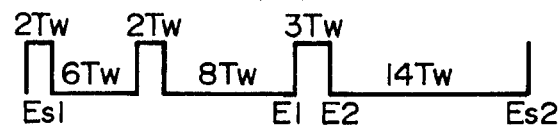
Figure 11C:
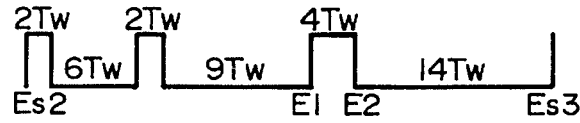
Figure 11D:
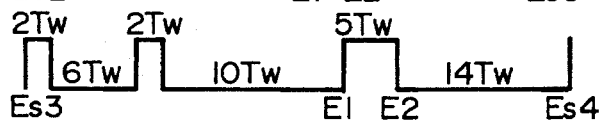
Figure 11E:
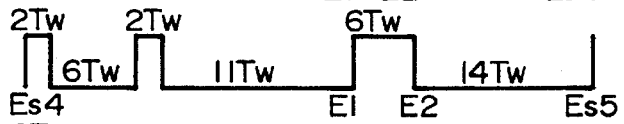
Figure 11F:
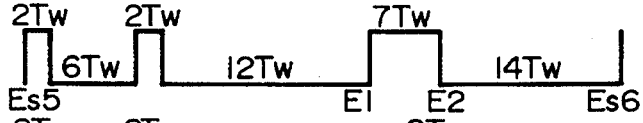
Figure 11G:
Figure 11H:
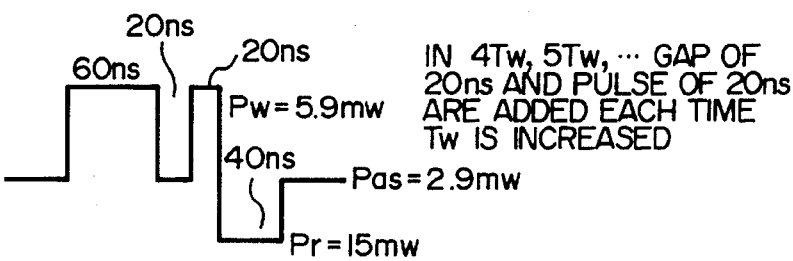

As shown in FIG. 11H, a recording pulse used herein, for example, is formed by the repetition of a leading pulse of 60 ns, a gap of 20 ns and a pulse of 20 ns. A pulse width of this repetition is synchronized with a write clock. An intermediate level Pas other than the recording pulse was set to 2.9 mW, a recording level Pw was set to 5.9 mW, and a read-out pulse Pr was set to 40 ns at the completion of the recording pulse, whereafter the intermediate level Pas was again set to (2.9 mW). The number of the repeated gaps and the number of the repeated pulses were added in response to the length of the recording pattern. The modulation system employed the (1, 7) modulation system.

Figure 12:
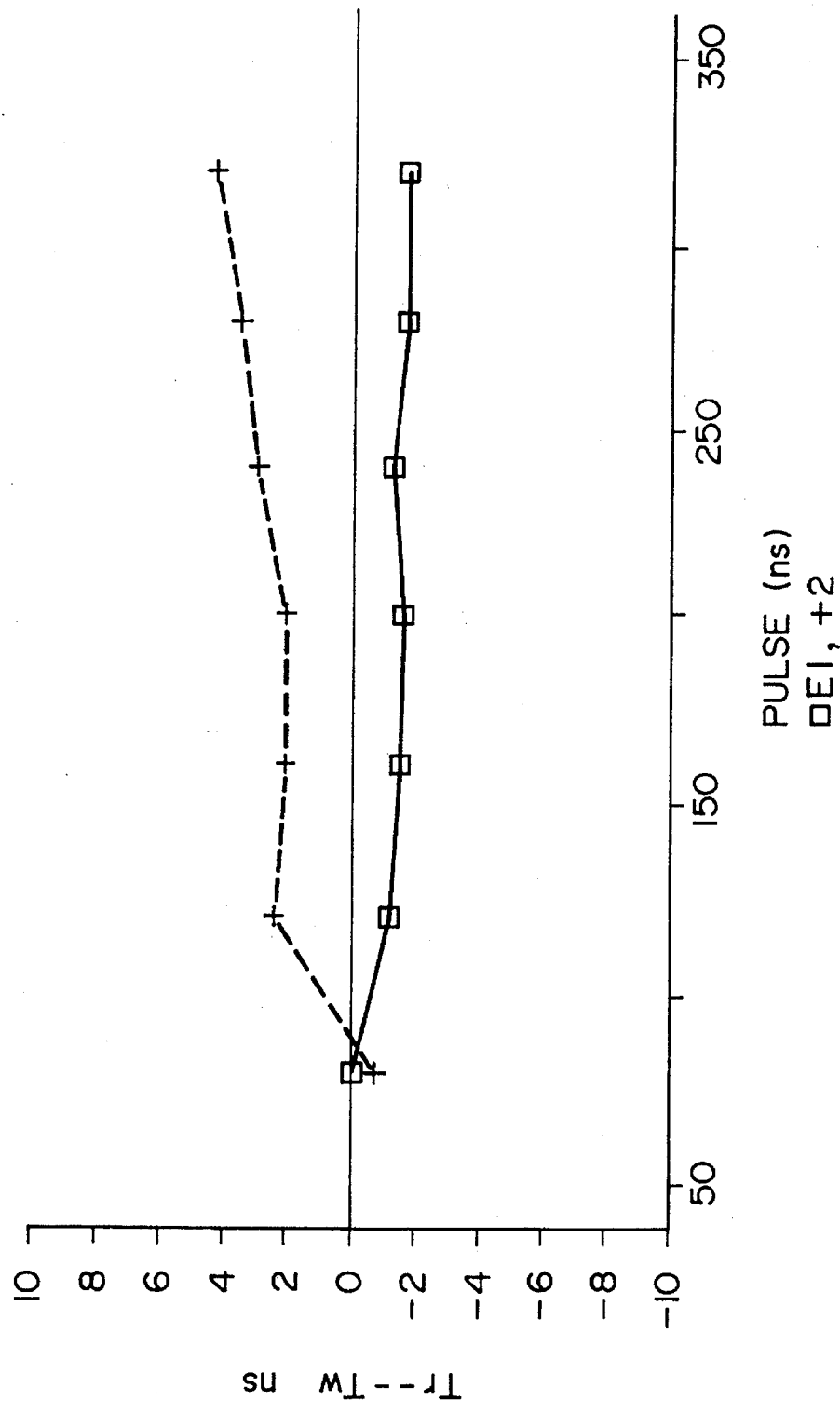
FIG. 12 is a graph showing measured results of edge shifts of recording patterns recorded in accordance with FIGS. 11A through 11I.

A recording domain is recorded at an arbitrary position on the disk by the recording pulse shape shown in FIG. 11H. Thereafter, the reproducing system employs an original waveform slice system, and 2PLL-system to thereby reproduce the recorded domain. By using this reproducing circuit, a difference between the recording domain length (i.e., pulse width expressed by E1, E2 shown in FIGS. 11A to 11G) that is desired to be recorded and the domain length recorded as a result of playback is defined as an edge shift and then measured. FIG. 12 shows measured results. Study of FIG. 12 reveals that rear portions (E2 portions in FIGS. 11A to 11G) of the recording pattern are affected by the position shift even though the recording pulse of the shape shown in FIG. 11H is used in the mark length recording.

As one method in which the position shift of the edge of the reproducing signal corresponding to the rear portion of the recording pattern is corrected and the position shift amount is made substantially constant independently of the recording pattern length, the recording level Pw is separated into a first recording level Pw1 and a second recording level Pw2. In this embodiment, the power level of the repetitive pulse is set to the second recording level Pw2.

An outline of the above-mentioned method is similar to the selecting method of the intermediate level Pas shown in FIG. 9. Initially, Pw2=Pw1 is set and then the recording pattern from the leading edge E1, the trailing edge E2 and time 2Tw to 8Tw shown in FIG. 11, for example, is recorded. With respect to the recording domain thus recorded, the rear edge position shift must be considered rather than the front edge position shift because the power level is lowered to the power level Pr after the domain was recorded with the power Pw and, as shown in FIGS. 11A through 11G, the gaps are provided so as to protect the recording pattern from the heat generated from the preceding E1, E2. As described hereinbefore, FIG. 12 shows the edge position shift value Tr–Tw at the trailing edge portion E2. Study of FIG. 12 reveals that the edge position shift value Tr–Tw is large as the recording pulse time (Tw=40 ns) is long.

Figure 13:
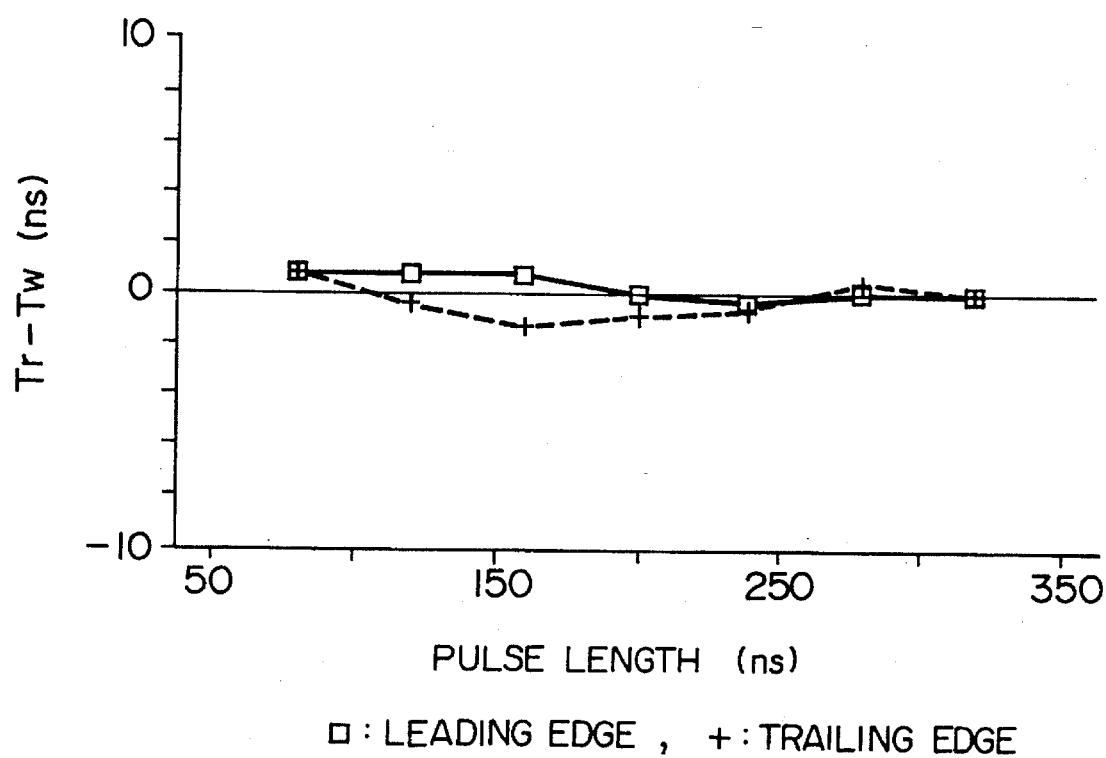
FIG. 13 is a graph showing measured results of edge shifts of recording patterns recorded in accordance with FIGS. 11A through 11I.

The edge position shift in FIG. 12 shows that a domain whose trailing edge portion E2 is extended rearward as compared with the recording pattern is recorded. The extended rear edge of the domain can fall within substantially constant range by adjusting the repetitive pulse level of the recording pulse shape or controlling the recording pulse width containing the repetitive pulse number (see FIG. 13).

Figure 11I:
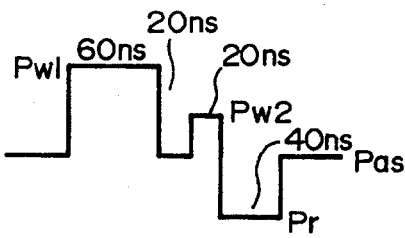

As shown in FIG. 11I, for example, the power level of the repetitive pulse is set to Pw2<Pw1 and an optimum value of Pw2 can be selected. The second recording level Pw2 is selected by a method similar to that used when the intermediate level Pas is selected.

When the recording pulse shape and the power level are not controlled as described above, the edge position shift that had been 10 ns at maximum could be suppressed to be less than ±2 ns. Therefore, the recording domain having the width of 0.07 μm and having the length of from 0.75 to 3.0 μm could be formed stably, and the recording capacity of about 1 GB on the single-sided 5.25-inch disk can be realized by using together the MCAV format and the mark length recording format. When the test recording is carried out by using the recording pattern of the present invention regardless of the structures of the disks, a compatibility between the disks can be secured while the high density recording is maintained. This effect can be applied to an optical disk of a light intensity modulation overwrite type only by replacing an auxiliary light power with an erasing power similarly to the embodiment of the present invention independently of the type of the magneto-optical disk. Also, this effect can be applied to an optical disk of a phase change type similarly to the case of the optical disk of the light intensity modulation overwrite type. In addition to the recording control operation done by the test recording, if the test recording is carried out in order to detect the fluctuations of ambient temperatures of the disk and the disk driver, then a recording controllability can be improved much more.

The process for forming the recording pattern which becomes the base of the recording pulse shown in FIGS. 9 and 11H will be described with reference to a conceptual diagram of FIG. 14 and timing charts of FIGS. 5A through 15N.

Figure 14:
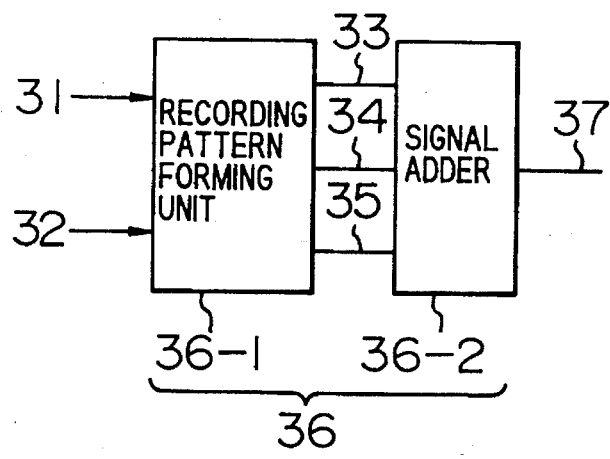
FIG. 14 is a schematic fragmentary block diagram showing a circuit arrangement of a unit which generates a recording pulse.

A recording pattern forming apparatus 36 comprising a recording pattern forming unit 36-1 and a signal adder 36-2 shown in FIG. 14 is supplied with a clock 31 and data 32 that was modulated previously, and forms digital signals representative of a pulse 33 having a first recording level Pw1, a pulse 34 having an intermediate level Pas and a pulse 35 having a second recording level Pw2. A digital signal representing a recording pattern is obtained by adding these digital signals. A specific method of forming the pulses 33, 34 and 35 will be described with reference to the timing charts of FIGS. 15A through 15N. FIGS. 15A through 15N are the timing charts corresponding to data having a pulse width 2Tw and data having a pulse width 5Tw, respectively.

When a clock shown in FIG. 15A and data shown in FIG. 15B are input, the data shown in FIG. 15B is delayed by Tw/2 to present a signal shown in FIG. 15C. The signal shown in FIG. 15C and the data shown in FIG. 15B are calculated in an AND fashion to thereby produce a signal shown in FIG. 15D. Also, the signal shown in FIG. 15D is delayed by 3Tw/2 (signal shown in FIG. 15E) and then calculated with the signal shown in FIG. 15D in an AND fashion (signal shown in FIG. 15F). Then, a NOT of FIG. 15A is ANDed with the signal shown in FIG. 15F (see signal shown in FIG. 15H).

As described above, the signal (shown in FIG. 15C) representing the repetitive pulse 35 can be obtained. Also, a signal (see FIG. 15J) representing the pulse 33 having the recording power level Pw can be obtained by calculating a NOT (see signal shown in FIG. 15C) of FIG. 15E and the signal shown in FIG. 15B in an AND fashion.

Further, a NOT (see signal shown in FIG. 15N) can be obtained by calculating a signal (shown in FIG. 15K) which results from delaying the signal shown in FIG. 15B by Tw and a NOT (see signal shown in FIG. 15L) of FIG. 15B in an AND fashion (signal shown in FIG. 15M and signal shown in FIG. 15M). FIG. 15N shows the pulse 34 having the intermediate level Pas.

Thus, the recording pattern can be formed by the above-mentioned method independently of the pattern width.

Furthermore, since the optimum recording pulse is set by carrying out the test recording before recording information to be recorded, the accurate recording mark can be obtained independent of the ambient temperature of the apparatus including the disk and the disk structure. Furthermore, a compatibility between different kinds of disks and between different apparatus can be maintained.

What is claimed is:

1. An optical recording control method comprising the steps of:

recording a test pattern at a constant time interval for detecting a fluctuation of recording conditions before recording information to be recorded on a magneto-optical recording disk;

detecting an ambient temperature and at least one characteristic of a magneto-optical recording disk to be used from a result provided when said recorded test pattern is reproduced; and setting a unit recording laser power used when said information to be recorded is recorded on the basis of said detected result, wherein said unit recording laser power is formed of at least four levels, i.e., a read-out level, an intermediate level, a first recording level and a second recording level, a ratio between said intermediate level and said first recording level is set in a range of from 1.50 to 1.80, a ratio between said intermediate level and said second recording level is set in a range of from 1.50 to 1.80, and a ratio between said first recording level and said second recording level is set in a range of from 1.0 to 0.90.

2. An optical recording control method comprising the steps of:

recording a predetermined recording pattern on a magneto-optical recording disk by a predetermined recording pulse before recording user data on said disk;

obtaining a reproduced signal based on said recording pattern thus recorded from said disk;

detecting an edge shift amount of a recording mark between said reproduced signal and said recording pattern;

correcting said predetermined recording pulse by changing an energy level of said predetermined recording pulse in accordance with said edge shift amount; and recording said user data by said corrected recording pulse;

wherein at least a plurality of recording marks are recorded on said disk by said recording pattern, said plurality of recording marks are reproduced, and said recording pulse is corrected on the basis of a reproduced signal indicative of a length of said recording mark.

3. The optical recording control method according to claim 2, wherein a reference clock is formed on the basis of a reproduced signal indicative of an interval of said recording marks.

4. An optical recording control method comprising the steps of:

recording a predetermined recording pattern on a magneto-optical recording disk by a predetermined recording pulse before recording user data on said disk;

obtaining a reproduced signal based on said recording pattern thus recorded from said disk;

detecting an edge shift amount of a recording mark between said reproduced signal and said recording pattern;

correcting said predetermined recording pulse by changing an energy level of said predetermined recording pulse in accordance with said edge shift amount; and recording said user data by said corrected recording pulse;

wherein a power level that constructs the energy level of said recording pulse is comprised of a fine pulse formed of at least three levels, and said three levels are a read-out level having an energy level sufficient for reproducing information, an intermediate level for previously heating a nearby-position at which information is recorded, and a recording level having a power level for recording information.

5. The optical recording control method according to claim 4, wherein said intermediate level and said recording level have a predetermined power level ratio therebetween.

6. The optical recording control method according to claim 5, wherein a correction of said recording pulse is such that said recording pulse is modulated by a level between said intermediate level and said recording level.

7. The optical recording control method according to claim 4, wherein said recording level is comprised of a first recording level and a second recording level.

8. The optical recording control method according to claim 7, wherein a ratio between said intermediate level and said first recording level falls in a range of from 1.5 to 1.8, a ratio between said intermediate level and said second recording level falls in a range of from 1.5 to 1.8, and a ratio between said first recording level and said second recording level falls in a range of from 0.9 to 1.0.

9. The optical recording control method according to claim 4, wherein at least a plurality of recording marks are recorded on said disk by said recording pattern, said plurality of recording marks are reproduced, and a reference clock is formed on the basis of a reproduced signal indicative of an interval of said recording marks.

10. An optical recording control method for recording, reproducing or erasing information onto or from a magneto-optical recording disk by using at least an externally applied magnetic field and a laser light, comprising the steps of:

recording a test pattern on said magneto-optical disk;

reproducing said test pattern from said magneto-optical disk;

evaluating output waveforms of said reproduced test pattern; and recording data to be recorded onto said magneto-optical disk;

wherein said laser light is irradiated as light pulses having different power levels of a first level for recording, a second level for pre-heating and a third level for reproducing, said step of recording data to be recorded being performed by changing said power levels while keeping a ratio of said first and second power levels at a constant value on the basis of results obtained in said step of evaluating output waveforms of said reproduced test pattern.

11. The optical recording control method according to claim 10, wherein when a recording is carried out by using a recording laser pulse waveform, at least either a recording medium structure or a pulse width of said laser pulse is detected, and a power level of said laser beam is changed by changing a set value of a ratio between the set values of first and second levels.

12. The optical recording control method according to claim 10, wherein a recording magnetic domain recorded has a constant magnetic domain width.

13. The optical recording control method according to claim 10, wherein when a recording is carried out by using said recording laser pulse waveform, a portion of said second level is comprised of a plurality of pulse groups, and said plurality of pulses are modulated between said first level and said second levels.

14. The optical recording control method according to claim 13, wherein pulse groups immediately after said pulse groups having said second level of said plurality of pulse groups have a power lower than said first level during a constant period and again have said first level.

15. The optical recording control method according to claim 10, wherein when a recording is carried out by using a recording laser pulse waveform, a recording medium is pre-heated by said first level, and information to be recorded is recorded at said second level.

16. The optical recording control method according to claim 15, wherein when a recording is carried out by using a recording laser waveform, a portion of said second level is comprised of a plurality of pulse groups, said plurality of pulse groups select the number of succeeding pulses in response to a length of a pattern determined by information to be recorded, and a leading pulse and said succeeding pulse have different power levels and different pulse widths therebetween.

17. A recording control method for recording, reproducing or erasing information onto or from a magneto-optical recording disk by using a laser beam and an externally applied magnetic field, comprising the steps of:

recording a predetermined recording pattern on said magneto-optical disk by applying a predetermined recording pulse before recording user data on said magneto-optical disk;

obtaining a reproduced signal based on said recording pattern recorded from said magneto-optical disk;

determining an ambient temperature and at least one characteristic of said magneto-optical disk on the basis of said reproduced signal; and recording information by using a recording pulse of said laser beam whose power level is controlled in response to the determined results of the ambient temperature and at least one characteristic of said magneto-optical disk;

wherein said recording pulse is formed of at least four power levels of said laser beam, said four power levels being formed of a read-out level, an intermediate level, a first recording level and a second recording level, and a ratio between said intermediate level and a plurality of recording levels being set within a constant range.

18. The recording control method according to claim 17, wherein a ratio between said intermediate level and said first recording level is set in a range of from 1.50 to 1.80, a ratio between said intermediate level and said second recording level is set in a range of from 1.50 to 1.80, and a ratio between said first recording level and said second recording level is set in a range of from 1.0 to 0.90.

19. The recording control method according to claim 17, wherein said recording pulse is formed of a plurality of fine pulses having a constant interval, a level of a leading pulse of said fine pulses is set to a first recording level, a level of second and succeeding fine pulses is set to a second recording level, a level of said plurality of fines pulses is set to an intermediate level, and a level of a constant period provided immediately after said recording pulse indicative of a unit information code is set to a read out level.

20. The recording control method according to claim 19, wherein a pulse width of said leading pulse is larger than widths of said second and succeeding fine pulses.

21. The recording control method according to claim 19, wherein a recording mark of a minimum shape recorded on said recording medium is formed of said leading pulse.

22. The recording control method according to claim 19, wherein a width of said fine pulse or a gap between said plurality of fine pulses is set to a time width of an integral multiple of or of an inverse of an integral multiple of a recording control clock.

23. The recording control method according to claim 22, wherein intervals of said plurality of fine pulses are equal at least in said recording pulse indicative of said unit information code.

* * * * *